(12) United States Patent
Sliskovic et al.

(10) Patent No.: US 12,455,359 B2
(45) Date of Patent: Oct. 28, 2025

(54) METHOD FOR CALIBRATING A LASER SCANNER, AND TECHNICAL APPARATUS

(71) Applicant: SEW-EURODRIVE GMBH & CO. KG, Bruchsal (DE)

(72) Inventors: Maja Sliskovic, Ettlingen (DE); Valentin Harr, Altensteig (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 249 days.

(21) Appl. No.: 18/272,398

(22) PCT Filed: Dec. 2, 2021

(86) PCT No.: PCT/EP2021/084026
§ 371 (c)(1),
(2) Date: Jul. 14, 2023

(87) PCT Pub. No.: WO2022/152463
PCT Pub. Date: Jul. 21, 2022

(65) Prior Publication Data
US 2024/0085542 A1  Mar. 14, 2024

(30) Foreign Application Priority Data
Jan. 14, 2021 (DE) .......................... 102021000126.5

(51) Int. Cl.
*G01S 7/497* (2006.01)
*G01S 17/931* (2020.01)
(Continued)

(52) U.S. Cl.
CPC .......... *G01S 7/4972* (2013.01); *G01S 17/931* (2020.01); *G01B 11/26* (2013.01); *G01S 7/4086* (2021.05); *G01S 7/497* (2013.01); *G01S 17/86* (2020.01)

(58) Field of Classification Search
CPC .... G01S 7/4972; G01S 17/931; G01S 7/4086; G01S 7/497; G01S 17/86; G01S 17/42; G01B 11/26
See application file for complete search history.

(56) References Cited

U.S. PATENT DOCUMENTS

2006/0290920 A1\* 12/2006 Kampchen ............ G01S 7/4972
356/139.07
2019/0331482 A1\* 10/2019 Lawrence ............. G01S 7/4052
356/4.01
(Continued)

FOREIGN PATENT DOCUMENTS

DE    102021000474 A1   9/2021
EP       1615047 A2    1/2006
(Continued)

OTHER PUBLICATIONS

International Report on Patentability issued in corresponding International Application No. PCT/EP2021/084026 dated Jul. 4, 2023, pp. 1-7, English Translation.
(Continued)

*Primary Examiner* — Michelle M Iacoletti
*Assistant Examiner* — Judy Dao Tran
(74) *Attorney, Agent, or Firm* — Carter, DeLuca & Farrell LLP

(57) ABSTRACT

In a method for calibrating a laser scanner of a vehicle by at least one reflection unit for reflecting a laser beam of the laser scanner, the at least one reflection unit including a first plate, a second plate, and a screen, the first plate being arranged between the second plate and the screen in a beam direction, the first plate having a first reflection surface, the second plate having a second reflection surface, the screen having a third reflection surface, a gap that extends in the vertical direction and in a transverse direction being formed between the first plate and the second plate, and a projection
(Continued)

of the gap in the beam direction being incident on the third reflection surface, an alignment of the laser scanner being checked by a laser beam of the laser scanner being directed at the at least one reflection unit and the laser beam being moved in the transverse direction along the at least one reflection unit, and, for a plurality of positions of the laser beam in the transverse direction, a respective distance of the laser scanner from that reflection surface from which the laser beam is reflected being measured, and an alignment of the laser scanner being determined from the measured distances, and the alignment of the laser scanner being corrected in the case of an incorrect alignment of the laser scanner. An apparatus, configured to perform the method, includes at least one vehicle having a laser scanner, and at least one reflection unit for reflecting a laser beam of the laser scanner.

22 Claims, 8 Drawing Sheets

(51) Int. Cl.
    *G01B 11/26*     (2006.01)
    *G01S 7/40*     (2006.01)
    *G01S 17/86*     (2020.01)

(56) References Cited

U.S. PATENT DOCUMENTS

| | | | |
|---|---|---|---|
| 2020/0158840 A1* | 5/2020 | Ikram | G06T 7/80 701/33.1 |
| 2020/0191927 A1* | 6/2020 | Lin | G01S 7/497 348/136 |
| 2021/0208263 A1* | 7/2021 | Sutavani | G01S 17/42 702/95 |
| 2021/0285760 A1* | 9/2021 | Su | G06T 7/80 356/139.09 |
| 2021/0333378 A1* | 10/2021 | Theos | B66F 9/0755 356/6 |

FOREIGN PATENT DOCUMENTS

| | | | |
|---|---|---|---|
| EP | 2210780 A1 | | 7/2010 |
| JP | 2009168472 A | * | 7/2009 |
| WO | 2021170292 A1 | | 9/2021 |

OTHER PUBLICATIONS

International Search Report issued in corresponding International Application No. PCT/EP2021/084026 dated Mar. 1, 2022, pp. 1-2, English Translation.

* cited by examiner

METHOD FOR CALIBRATING A LASER SCANNER, AND TECHNICAL APPARATUS

FILED OF THE INVENTION

The present invention relates to a method for calibrating a laser scanner, e.g., of a vehicle by at least one reflection unit for reflecting a laser beam of the laser scanner. The present invention also relates to a technical apparatus, e.g., configured to carry out the method.

BACKGROUND INFORMATION

Certain conventional vehicles, e.g., autonomous driving vehicles, such as self-driving mobile transport systems, have one or more laser scanners. Such mobile transport systems are used, for example, to transport objects within a technical apparatus. The technical apparatus is, e.g., an industrial application, for example, a production plant. A laser scanner emits a laser beam, detects a reflected laser beam, and calculates therefrom a distance from an object reflecting the laser beam. A laser scanner is used by the autonomous driving vehicle, e.g., to detect obstacles in the technical apparatus.

The vehicle's laser scanner should be aligned so that laser beams emitted by the laser scanner are as parallel as possible to a ground on which the vehicle is located. This ensures that the laser beams are not reflected by the ground, but by objects, especially obstacles, in the surrounding area. Such objects can be used for locating and navigating the vehicle. Aligning the laser scanner so that the laser beams are parallel to a ground, i.e., horizontally, is called calibrating the laser scanner.

A method for calibrating a distance image sensor is described in German Patent Document No. 10 2004 033 114. For this purpose, a device is used that has calibration objects with three calibration surfaces.

German Patent Document No. 101 16 278 describes a method for adjusting a distance sensor arranged on a vehicle. For this purpose, a device is used that has three reference objects.

A method for calibrating a laser scanner is described in Japanese Patent Document No. 2009-168472, in which a laser scanner is arranged in front of a reflection unit, which has several reflection surfaces. The laser beams emitted by the laser scanner are reflected by the reflection surfaces.

SUMMARY

Example embodiments of the present invention provide a method for calibrating a laser scanner of a vehicle, and a technical apparatus.

According to example embodiments, in a method for calibrating a laser scanner of a vehicle by at least one reflection unit for reflecting a laser beam of the laser scanner, the at least one reflection unit includes a first plate, a second plate, and a screen. The first plate is arranged between the second plate and the screen in a beam direction, the first plate having a first reflection surface extending at least approximately perpendicular to the beam direction, the second plate having a second reflection surface extending at least approximately perpendicular to the beam direction, and the screen having a third reflection surface extending at least approximately perpendicular to the beam direction. The first plate is arranged offset from the second plate in a vertical direction so that a gap that extends in the vertical direction and in a transverse direction is formed between the first plate and the second plate, and the screen is adapted and arranged so that a projection of the gap in the beam direction is incident on the third reflection surface of the screen. An alignment of the laser scanner is checked by virtue of a laser beam of the laser scanner being directed at the at least one reflection unit at least approximately in the beam direction, the laser beam being moved in the transverse direction along the at least one reflection unit, and, for a plurality of positions of the laser beam in the transverse direction, a respective distance of the laser scanner from that reflection surface from which the laser beam is reflected being measured. An alignment of the laser scanner is determined from the measured distances of the laser scanner from the respective reflection surface, and the alignment of the laser scanner is corrected and/or an instruction for correction is given in the case of an incorrect alignment of the laser scanner. The instruction for correction is transmitted, for example, to a central computer or to an operator.

The vertical direction extends perpendicular to the beam direction. The vertical direction also extends perpendicular to the transverse direction. The beam direction also extends perpendicular to the transverse direction. The directional specifications used here, e.g., vertical direction, transverse direction and beam direction, are each defined in relation to the reflection unit. Any direction that extends perpendicular to the vertical direction is also referred to as a horizontal direction. The transverse direction and the beam direction thus represent horizontal directions. The vertical direction also extends at least approximately perpendicular to a ground on which the at least one reflection unit stands and on which the vehicle is located. Aligning the laser scanner so that the laser beams of the laser scanner extend in a horizontal direction is called calibrating the laser scanner.

During calibration, the vehicle's laser scanner, or, respectively, the scan plane, is at a defined distance in the vertical direction from the ground. The first plate and the second plate are, for example, aligned so that the gap, e.g., a center of the gap, is at the same defined distance in vertical direction to the ground as a scan plane of the laser scanner. A distance of the laser scanner from the second reflection surface is smaller than a distance of the laser scanner from the first reflection surface. A distance of the laser scanner from the first reflection surface is smaller than a distance of the laser scanner from the third reflection surface.

When the laser beam impinges on the first screen, the laser beam is reflected by the first reflection surface of the first screen. When the laser beam impinges on the second screen, the laser beam is reflected by the second reflection surface of the second screen. When the laser beam impinges on the gap, the laser beam is reflected by the third reflection surface of the screen.

An alignment of the laser scanner is determined from the measured distances of the laser scanner to the respective reflection surface. When the laser beam is reflected by the first reflection surface of the first screen, the laser scanner is tilted upward in the vertical direction, away from the ground. When the laser beam is reflected by the second reflection surface of the second screen, the laser scanner is tilted downward in the vertical direction, toward the ground. When the laser beam is reflected by the third reflection surface of the screen, the laser beam extends in a horizontal direction and the laser scanner is aligned horizontally.

During calibration, the laser scanner is also at a defined distance from the at least one reflection unit in the beam direction. The distance of the laser scanner in the beam direction from the reflection unit is significantly greater than an extension of the reflection unit in the transverse direction.

A distance of the laser scanner from a central area of a reflection surface is thus only insignificantly smaller than a distance of the laser scanner from an edge area of the reflection surface. Thus, a distance of the laser scanner in the beam direction from a reflection surface of the reflection unit is considered to be approximately constant. If the distance of the laser scanner in the beam direction from the reflection unit is of a similar order of magnitude as the extension of the reflection unit in the transverse direction, the approximation is not sufficiently accurate. In this regard, it is convenient to convert the polar coordinates provided by the laser scanner, e.g., beam angle and distance, into Cartesian coordinates, e.g., position in the transverse direction and distance in the beam direction.

The method described herein thus provides for calibration of a laser scanner of a vehicle, the vehicle being, e.g., an autonomous driving vehicle, such as a self-driving mobile transport system. The laser scanner provides for the autonomous driving vehicle to detect obstacles, for example. The method described herein requires a relatively small space, allows a relatively high accuracy in the calibration of the laser scanner, and requires a relatively small amount of time.

According to example embodiments, the checking of the alignment of the laser scanner is repeated at defined, e.g., periodic, time intervals. After each check, if the laser scanner is incorrectly aligned, the alignment of the laser scanner is corrected and/or an instruction for correction is given. The instruction for correction is transmitted, for example, to a central computer or to an operator. The repeated checks take place regularly, for example, daily, during the operation of the vehicle in a technical apparatus. For example, the repeated checks take place in an automated manner. The vehicle moves to the at least one reflection unit and automatically performs the check of the alignment of the laser scanner. If the alignment of the laser scanner is correct, the vehicle gives an appropriate message to a central computer and returns to normal operation. An incorrect alignment of the laser scanner is thus detected promptly.

According to example embodiments, the alignment of the laser scanner is corrected by adjusting the laser scanner so that the laser beam impinges on the third reflection surface while moving in the transverse direction through the gap. Then the laser beam of the laser scanner extends in a horizontal direction.

According to example embodiments, a slope of a ground on which the vehicle is located is determined before checking the alignment of the laser scanner. The at least one reflection unit is aligned so that the gap is at the same height in the vertical direction as the laser scanner. For example, a digital spirit level is used to determine the slope of the ground, with a visible point laser exiting the end of the level.

According to example embodiments, the determined alignment of the laser scanner is displayed visually and/or acoustically. Thus, it is visually and/or acoustically displayed whether the laser scanner is tilted upwards in the vertical direction, i.e., away from the ground, or whether the laser scanner is tilted downwards in the vertical direction, i.e., towards the ground, or whether the laser scanner is aligned horizontally. For example, the determined alignment of the laser scanner is further transmitted to a central computer.

According to example embodiments, the laser beam of the laser scanner is directed at a first reflection unit at least approximately in the beam direction of the first reflection unit, the laser beam is moved in the transverse direction of the first reflection unit along the first reflection unit, and, for a plurality of positions of the laser beam in the transverse direction, a distance of the laser scanner from that reflection surface of the first reflection unit from which the laser beam is reflected is measured in each case. Also, the laser beam of the laser scanner is directed at a second reflection unit at least approximately in the beam direction of the second reflection unit, the laser beam is moved in the transverse direction of the second reflection unit along the second reflection unit, and, for a plurality of positions of the laser beam in the transverse direction, a distance of the laser scanner from that reflection surface of the second reflection unit from which the laser beam is reflected is measured in each case. In this regard, the first reflection unit and the second reflection unit are aligned so that the vertical direction of the first reflection unit extends parallel to the vertical direction of the second reflection unit.

This arrangement of the two reflection units relative to each other allows the laser scanner to be calibrated for different beam angles of the laser scanner's laser beams and in relation to two horizontal axes that are orthogonal to each other. When the laser beam hits the gaps of both reflection units, the laser beam is reflected by the third reflection surfaces of the screens of both reflection units. The laser beam of the laser scanner extends in a horizontal direction in an angular range of more than 90°.

According to example embodiments, the first reflection unit and the second reflection unit are aligned so that the beam direction of the first reflection unit extends at least approximately perpendicular to the beam direction of the second reflection unit. This at least approximately perpendicular offset of the two reflection units relative to each other allows the calibration of the laser scanner to be performed for different beam angles of the laser scanner's laser beams and in relation to two horizontal axes that are orthogonal to each other.

According to example embodiments, the first reflection unit and the second reflection unit are aligned so that the beam direction of the first reflection unit extends at least approximately parallel to the transverse direction of the second reflection unit. This at least approximately perpendicular offset of the two reflection units relative to each other allows the calibration of the laser scanner to be performed for different beam angles of the laser scanner's laser beams and in relation to two horizontal axes that are orthogonal to each other.

For example, the first reflection unit and the second reflection unit are aligned so that the gap of the first reflection unit and the gap of the second reflection unit are aligned with each other in the vertical direction. If the two reflection units are standing on a common ground, the gaps of the reflection units are thus equidistant from the ground, and the laser beams of the laser scanner impinge on both gaps of both reflection units.

For example, an extension of the third reflection surface of the screen in the vertical direction is greater than an extension of the gap in the vertical direction, and an extension of the third reflection surface of the screen in the transverse direction is greater than an extension of the gap in the transverse direction. The projection of the gap in the beam direction is completely incident on the third reflection surface of the screen. Thus, even laser beams that impinge on the gap at a slight angle to the beam direction still are incident on the third reflection surface of the screen.

According to example embodiments, the at least one reflection unit has a first inner foot, a second inner foot, a first outer foot, and a second outer foot that are arranged offset from each other in the transverse direction and extend predominantly in the vertical direction. The first plate and the second plate extend in the transverse direction between the inner feet, and the screen extends in the transverse direction between the outer feet. When the laser beam impinges on a foot of the reflection unit, the laser beam is reflected by the corresponding foot of the reflection unit. This allows the calibration of the laser scanner to be performed with increased precision. Furthermore, the feet are used for mechanical fastening of the plates.

According to example embodiments, the first plate includes a protrusion having a fourth reflection surface extending at least approximately perpendicular to the beam direction. The fourth reflection surface is arranged offset from the first reflection surface in the beam direction. This simplifies the calibration of the laser scanner. For example, the offset of the fourth reflection surface from the first reflection surface makes it possible to determine whether the beam is incident on the first plate or the second plate.

For example, the at least one reflection unit has at least one spacer, which is arranged so that the first plate and the screen are offset from each other by a first distance in the beam direction. This allows the calibration of the laser scanner to be performed with increased precision. Furthermore, the at least one spacer can be used to mechanically fasten the screen.

According to example embodiments, the first reflection surface of the first plate and/or the second reflection surface of the second plate are covered with black foam. According to example embodiments, at least the edges of the first plate and/or the edges of the second plate adjacent to the gap of the reflection unit are covered with black foam.

According to example embodiments, a technical apparatus includes at least one vehicle having a laser scanner, and at least one reflection unit for reflecting a laser beam of the laser scanner. The technical apparatus is configured to carry out the method described herein. The technical apparatus is, for example, an industrial application, for example, a production plant.

Further features and aspects of example embodiments of the present invention are explained in more detail below with reference to the appended schematic Figures.

DETAILED DESCRIPTION

Figure 1:
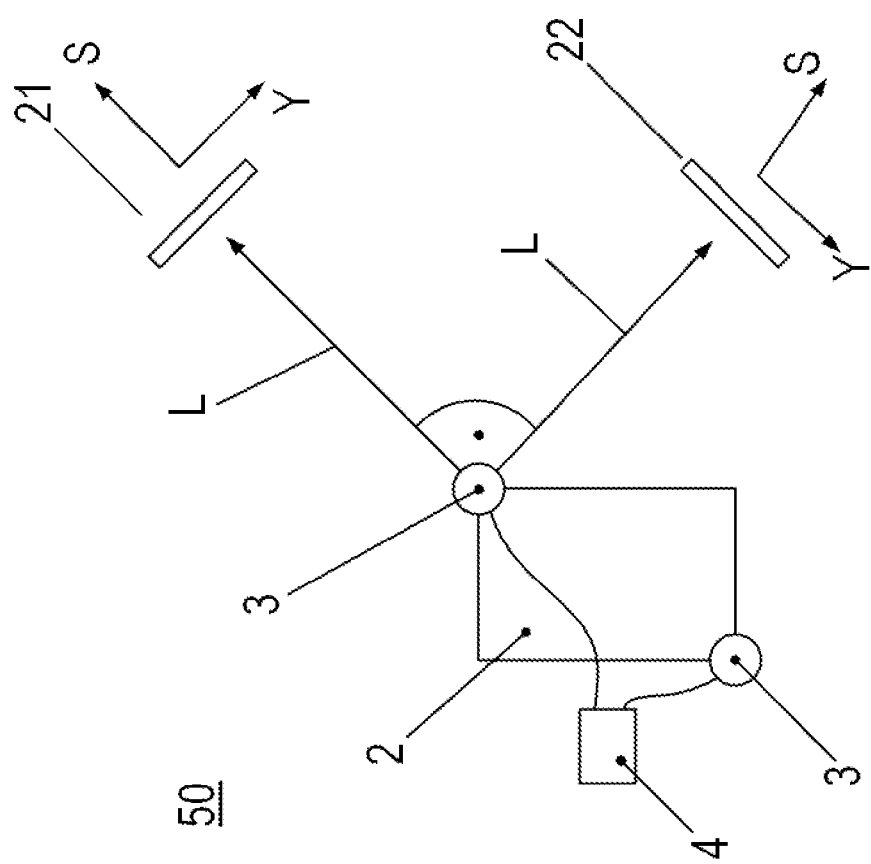
FIG. 1 schematically illustrates a device for calibrating a laser scanner.

FIG. 1 schematically illustrates f a device for calibrating a laser scanner 3 of a vehicle 2. For example, the vehicle 2 is an autonomous driving vehicle 2, e.g., a self-driving mobile transport system. The vehicle 2 has an approximately rectangular layout. A laser scanner 3 is arranged at each of two diagonally opposite corners of the vehicle 2. Each laser scanner 3 emits a laser beam L, detects a reflected laser beam, L and calculates therefrom a distance D from an object reflecting the laser beam L. Each laser beam L emitted by the laser scanners 3 is moved in an angular range of about 270°.

The laser scanners 3 are connected to a digital computer 4. During a calibration of the laser scanners 3, data, e.g., data on measured distances D from objects, are transmitted from the laser scanners 3 to the digital computer 4. The digital computer 4 determines an alignment of the laser scanner 3 from the measured distances D and displays the determined alignment of the laser scanner 3 visually as well as acoustically.

The device includes a first reflection unit 21 for reflecting a laser beam L of the laser scanner 3 and a second reflection unit 22 for reflecting a laser beam L of the laser scanner 3. For example, the vehicle 2 and the reflection units 21, 22 are arranged on a level ground 50. The reflection units 21, 22 are objects that reflect laser beams L.

Each of the reflection units 21, 22 has a front side which extends at least approximately perpendicular to a respective beam direction S. A respective transverse direction Y extends perpendicularly to the respective beam direction S. A respective vertical direction Z extends perpendicularly to the respective beam direction S and perpendicularly to the respective transverse direction Y. These directional indications, e.g., vertical direction Z, transverse direction Y, and beam direction S, are respectively defined with respect to the respective reflection unit 21, 22. For example, the vertical directions Z of the reflection units 21, 22 extend parallel to each other and perpendicular to the ground 50 on which the reflection units 21, 22 and the vehicle 2 are arranged.

Each of the reflection units 21, 22 is aligned so that a laser beam L emitted by the one laser scanner 3 of the vehicle 2, which impinges centrally on the front side of the respective reflection unit 21, 22 in the respective transverse direction Y, extends at least approximately in the respective beam direction S. At a certain reflection angle, the laser beam L therefore impinges at least approximately perpendicular on the front side of the respective reflection unit 21, 22.

The beam direction S of the first reflection unit 21 extends at least approximately perpendicular to the beam direction S of the second reflection unit 22. The beam direction S of the first reflection unit 21 extends at least approximately parallel to the transverse direction Y of the second reflection unit 22. A reflection angle at which the laser beam L impinges at least approximately perpendicular on the front side of the first reflection unit 21 is thus offset by at least approximately 90° from a reflection angle at which the laser beam L impinges at least approximately perpendicular on the front side of the second reflection unit 22.

Figure 2:
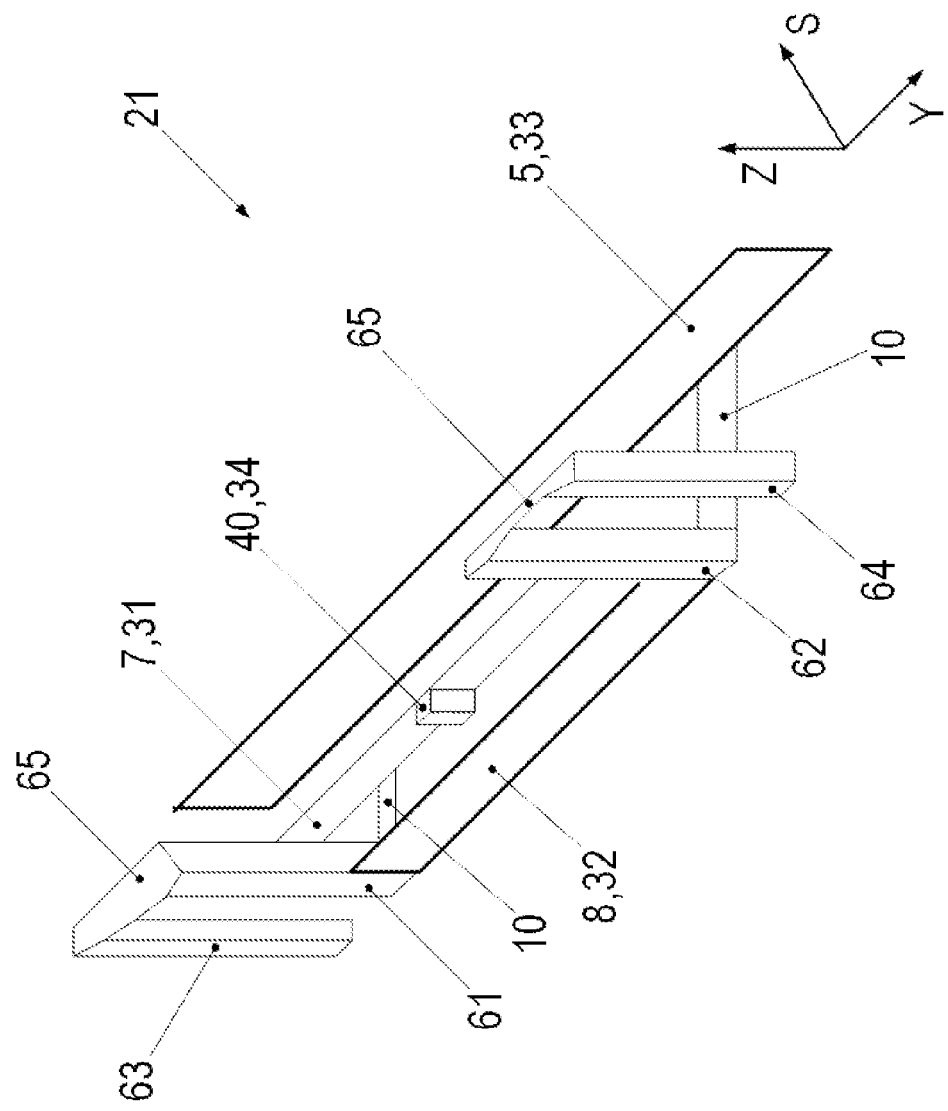
FIG. 2 is a perspective representation of a reflection unit.

FIG. 2 schematically illustrates one of the first reflection units 21 illustrated in FIG. 1. The two reflection units 21, 22 are, for example, identical. The reflection unit 21 includes a first plate 7, a second plate 8, and a screen 5. The first plate 7 is arranged between the second plate 8 and the screen 5 in the beam direction S. The first plate 7 and the screen 5 are arranged offset from each other by a first distance in the beam direction S. The first plate 7 and the second plate 8 are arranged offset from each other by a second distance in the beam direction S. The first plate 7 is arranged offset from the second plate 8 in the vertical direction Z. The second plate 8 is arranged closer to the ground 50 than the first plate 7.

The first plate 7 has a first reflection surface 31 extending at least approximately perpendicular to the beam direction S. The second plate 8 has a second reflection surface 32 that also extends at least approximately perpendicular to the beam direction S. The screen 5 has a third reflection surface 33, which also extends at least approximately perpendicular to the beam direction S.

The reflection unit 21 has a first inner foot 61, a second inner foot 62, a first outer foot 63, and a second outer foot 64. The feet 61, 62, 63, 64 extend mainly in the vertical direction Z. The plates 7, 8 are attached to the two inner feet 61, 62. The feet 61, 62, 63, 64 are arranged offset from each other in the transverse direction Y. The first feet 61, 63 are connected to each other by a transverse leg 65. The second feet 62, 64 are also connected to each other by a transverse leg 65.

A spacer 10 is attached to each of the inner feet 61, 62. The spacers 10 are arranged so that the first plate 7 and the screen 5 are offset from each other by the first distance in the beam direction S.

The first plate 7 includes a protrusion 40, which has a fourth reflection surface 34. The fourth reflection surface 34 extends perpendicular to the beam direction S. The fourth reflection surface 34 is arranged offset from the first reflection surface 31 in the beam direction S. For example, the fourth reflection surface 34 is arranged between the first reflection surface 31 and the second reflection surface 32 in the beam direction S, or the fourth reflection surface 34 is aligned with the second reflection surface 32.

Figure 3:
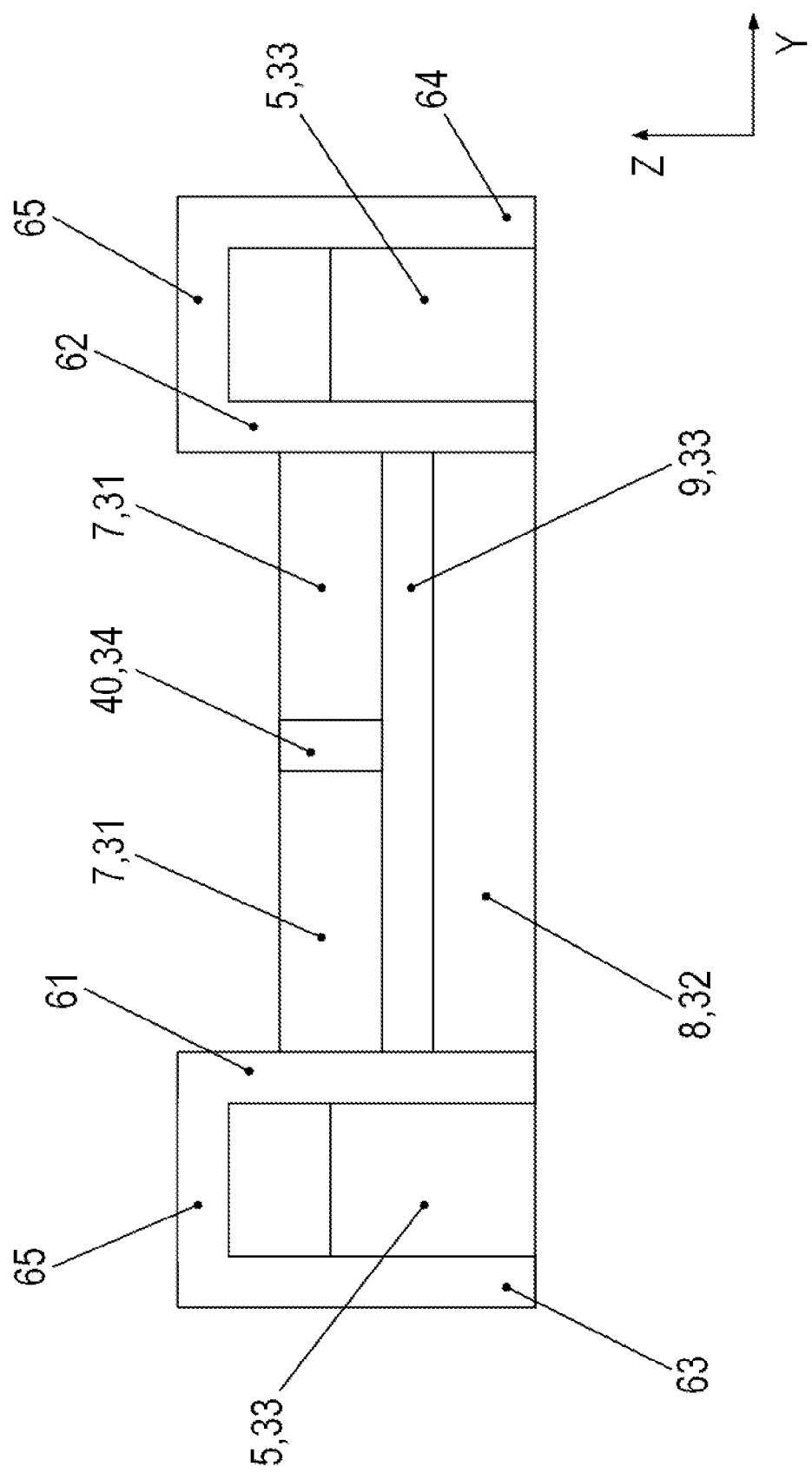
FIG. 3 is a front view of a reflection unit.

FIG. 3 is a front view, i.e., a view of a front side, of the reflection unit 21. The first plate 7 is arranged offset from the second plate 8 in the vertical direction Z so that a gap 9 is formed between the first plate 7 and the second plate 8, which gap extends in the vertical direction Z and in the transverse direction Y. In the transverse direction Y, the gap 9 is bounded by the two inner feet 61, 62. The first reflection unit 21 and the second reflection unit 22 illustrated in FIG. 1 are aligned so that the gap 9 of the first reflection unit 21 and the gap 9 of the second reflection unit 22 are aligned with each other in the vertical direction Z.

The screen 5 is adapted and arranged so that a projection of the gap 9 in the beam direction S is completely incident on the third reflection surface 33 of the screen 5. An extension of the third reflection surface 33 of the screen 5 in the vertical direction Z is greater than an extension of the gap 9 in the vertical direction Z, and an extension of the third reflection surface 31 of the screen 5 in the transverse direction Y is greater than an extension of the gap 9 in the transverse direction Y.

The screen 5 extends in the transverse direction Y between the outer feet 63, 64. For example, the third reflection surface 33 of the screen 5 is visible between the first feet 61, 63 and between the second feet 62, 64, respectively. The screen 5 extends in the vertical direction Z from the ground 50 to an upper edge of the first plate 7. The first plate 7 is arranged on the ground 50.

To calibrate one of the laser scanners 3 illustrated in FIG. 1, a laser beam L of the laser scanner 3 is directed at a reflection unit 21, 22. The laser beam L is moved in the transverse direction Y along the reflection unit 21, 22. In the process, the laser beam L passes through a range of reflection angles. Each position P of the laser beam L in the transverse direction Y corresponds to a specific reflection angle of the laser beam L. For a plurality positions P of the laser beam L in the transverse direction Y, a respective distance D of the laser scanner 3 from that reflection surface 31, 32, 33 from which the laser beam L is reflected is measured. An alignment of the laser scanner 3 is determined from the measured distances D.

In the transverse direction Y in the center of the reflection unit 21, 22, the laser beam L extends at least approximately in beam direction S and impinges there at least approximately perpendicular on the reflection unit 21, 22. If a distance of the laser scanner 3 in the beam direction S from the reflection unit 21, 22 is significantly greater than an extension of the reflection unit 21, 22 in the transverse direction Y, the reflection angle of the laser beam L is approximately proportional to the position P of the laser beam L in the transverse direction Y. If this approximation is not sufficiently accurate, the polar coordinates provided by the laser scanner 3, e.g., reflection angle and distance D, are to be converted into Cartesian coordinates, e.g., position P in transverse direction Y and distance D in beam direction S.

Figure 4:
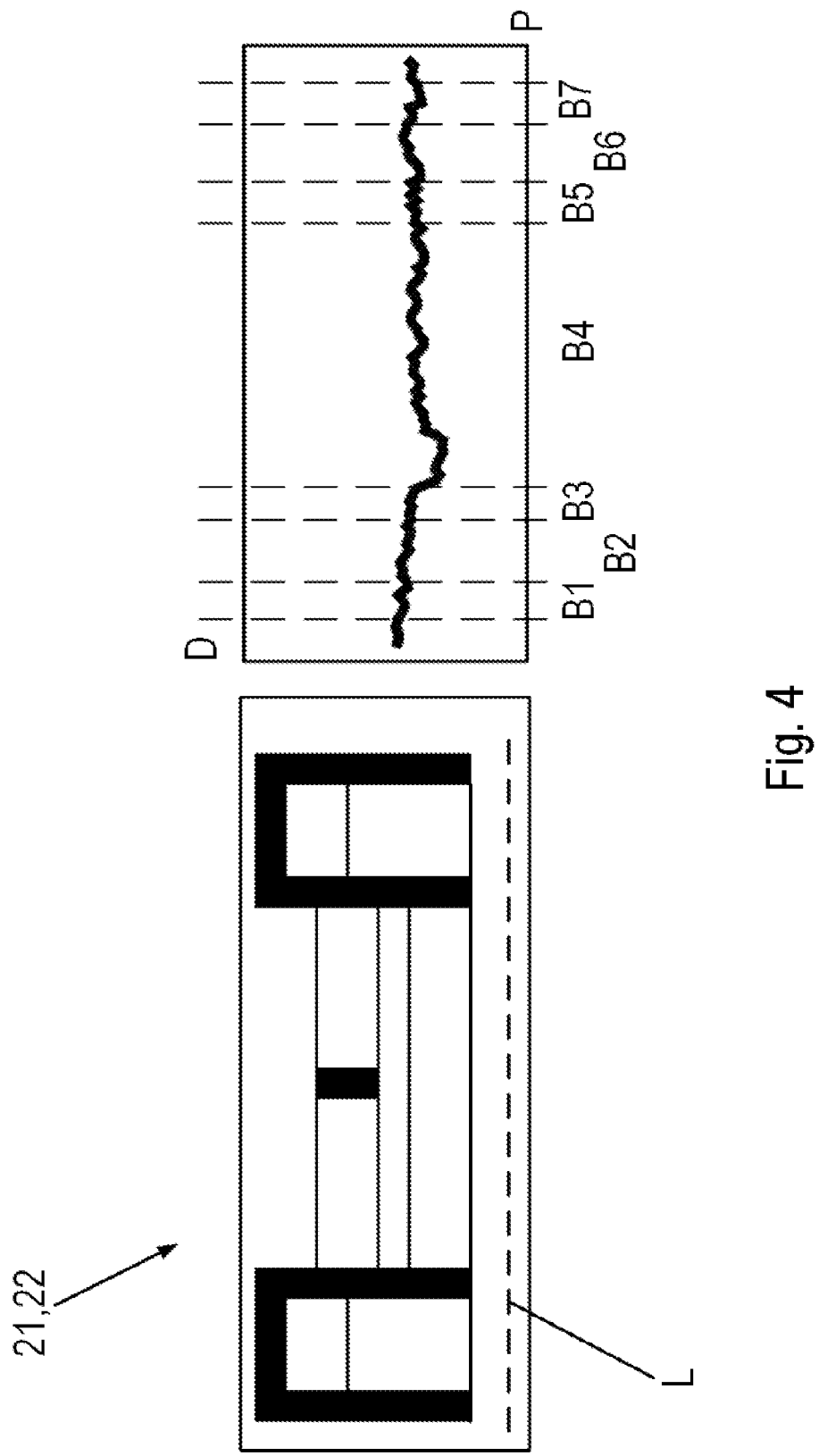
FIG. 4 illustrates measured distances.

FIG. 4 illustrates measured distances D as a function of the position P of the laser beam L in the transverse direction Y. The position P of the laser beam L is divided into seven sections B1, B2, B3, B4, B5, B6, B7.

In all seven sections B1, B2, B3, B4, B5, B6, B7 the laser beam L impinges on the ground 50. The laser beam L is diffusely reflected from the ground 50. The laser beam L thus is tilted downward, and the laser scanner 3 is thus aligned incorrectly, namely too low.

Figure 5:
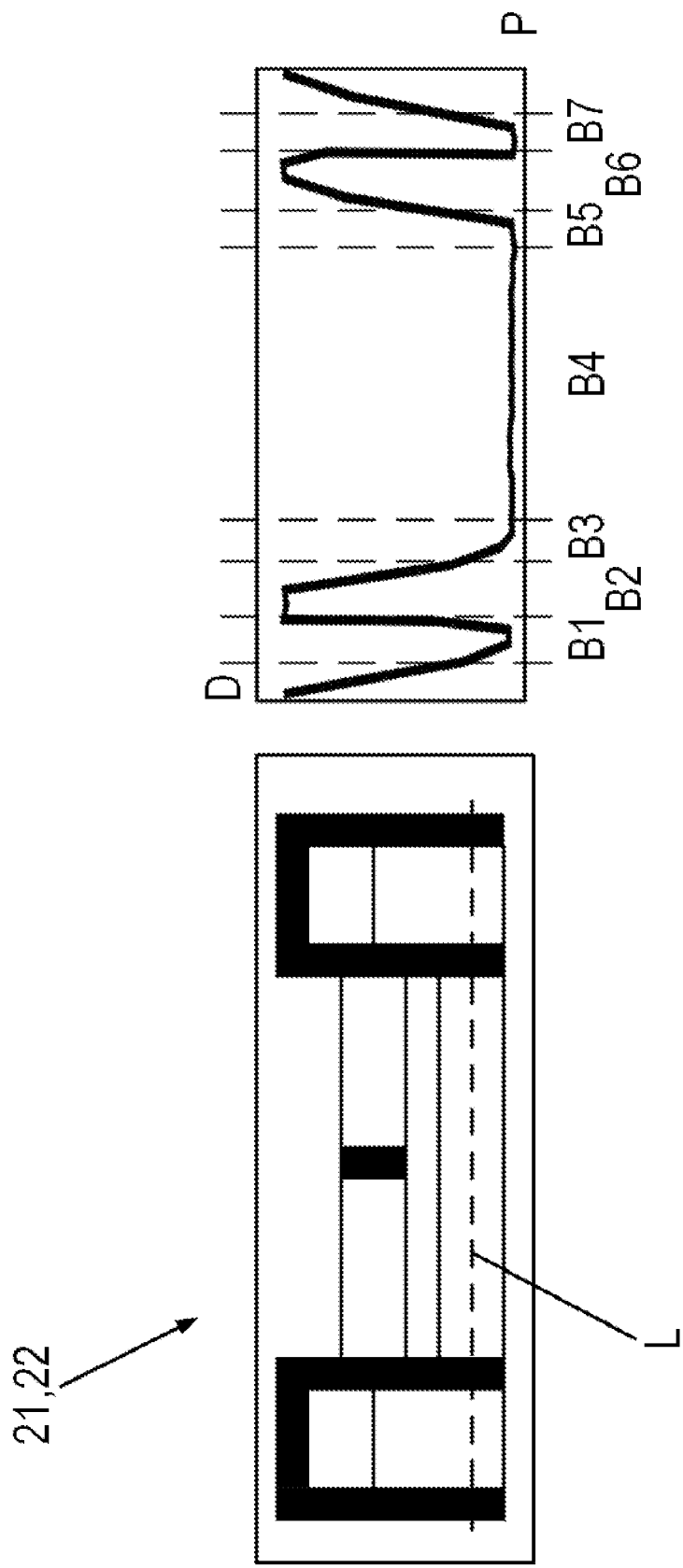
FIG. 5 illustrates measured distances.

FIG. 5 illustrates measured distances D as a function of the position P of the laser beam L in the transverse direction Y. The position P of the laser beam L is divided into seven sections B1, B2, B3, B4, B5, B6, B7.

In the first section B1, the laser beam L impinges on the first outer foot 63 and is reflected by it. In the second section B2, the laser beam L passes between the first outer foot 63 and the first inner foot 61 and impinges on the screen and is reflected by the third reflection surface 33. In the third section B3, the laser beam L impinges on the first inner foot 61 and is reflected by it. In the fourth section B4, the laser beam L impinges on the second plate 8 between the first inner foot 61 and the second inner foot 62 and is reflected by the second reflection surface 32. In the fifth section B5, the laser beam L impinges on the second inner foot 62 and is reflected by it. In the sixth section B6, the laser beam L passes between the second inner foot 63 and the second outer foot 64 and impinges on the screen 5 and is reflected by the third reflection surface 33. In the seventh section B7, the laser beam L impinges on the second outer foot 64 and is reflected by it. The laser beam L thus is tilted downward, and the laser scanner 3 is thus aligned incorrectly, namely too low.

Figure 6:
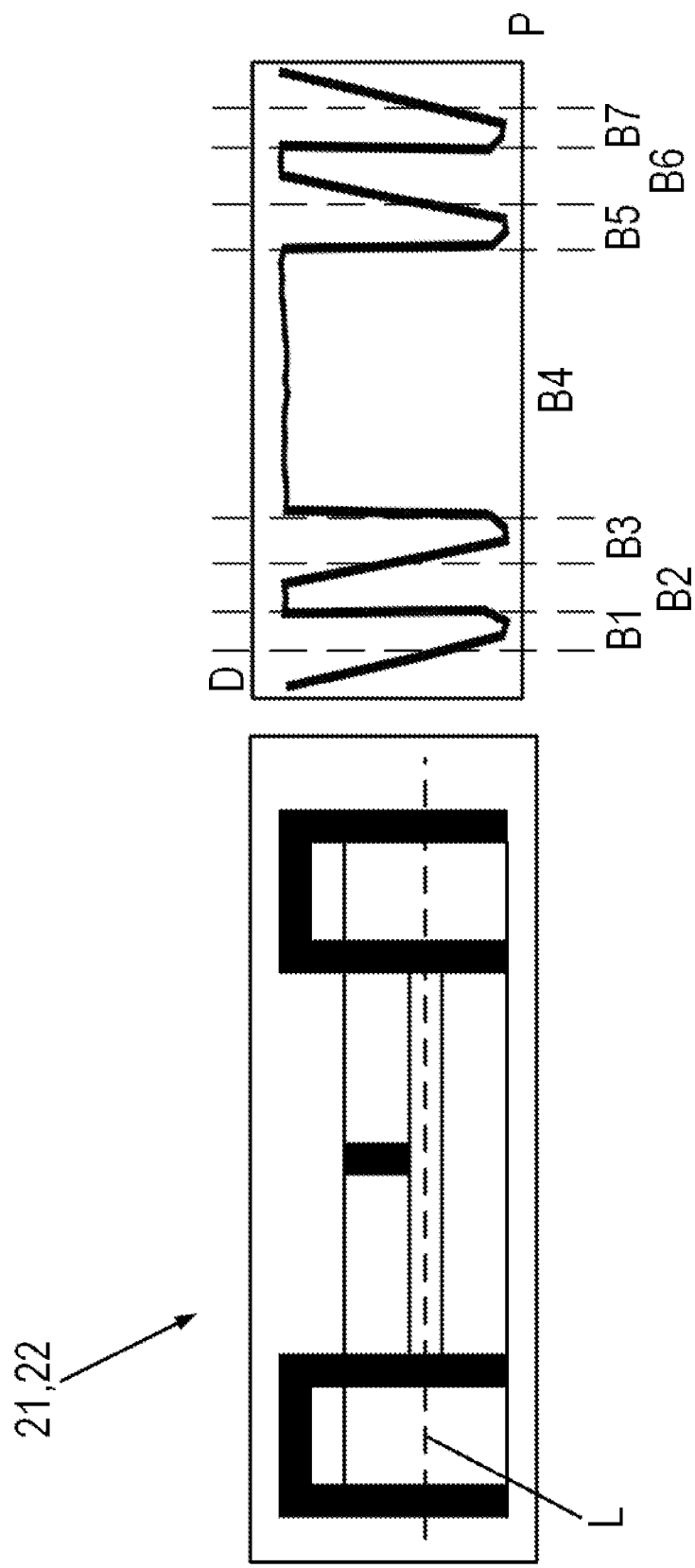
FIG. 6 illustrates measured distances.

FIG. 6 illustrates measured distances D as a function of the position P of the laser beam L in the transverse direction Y. The position P of the laser beam L is divided into seven sections B1, B2, B3, B4, B5, B6, B7.

In the first section B1, the laser beam L impinges on the first outer foot 63 and is reflected by it. In the second section B2, the laser beam L passes between the first outer foot 63 and the first inner foot 61 and impinges on the screen 5 and is reflected by the third reflection surface 33. In the third section B3, the laser beam L impinges on the first inner foot 61 and is reflected by it. In the fourth section B4, the laser beam L impinges on the gap 9 and thus on the screen 5 between the first inner foot 61 and the second inner foot 62 and is reflected by the third reflection surface 33. In the fifth section B5, the laser beam L impinges on the second inner foot 62 and is reflected by it. In the sixth section B6, the laser beam L passes between the second inner foot 63 and the second outer foot 64 and impinges on the screen 5 and is reflected by the third reflection surface 33. In the seventh section B7, the laser beam L impinges on the second outer foot 64 and is reflected by it. The laser beam L thus extends in a horizontal direction, and the laser scanner 3 is thus correctly aligned.

Figure 7:
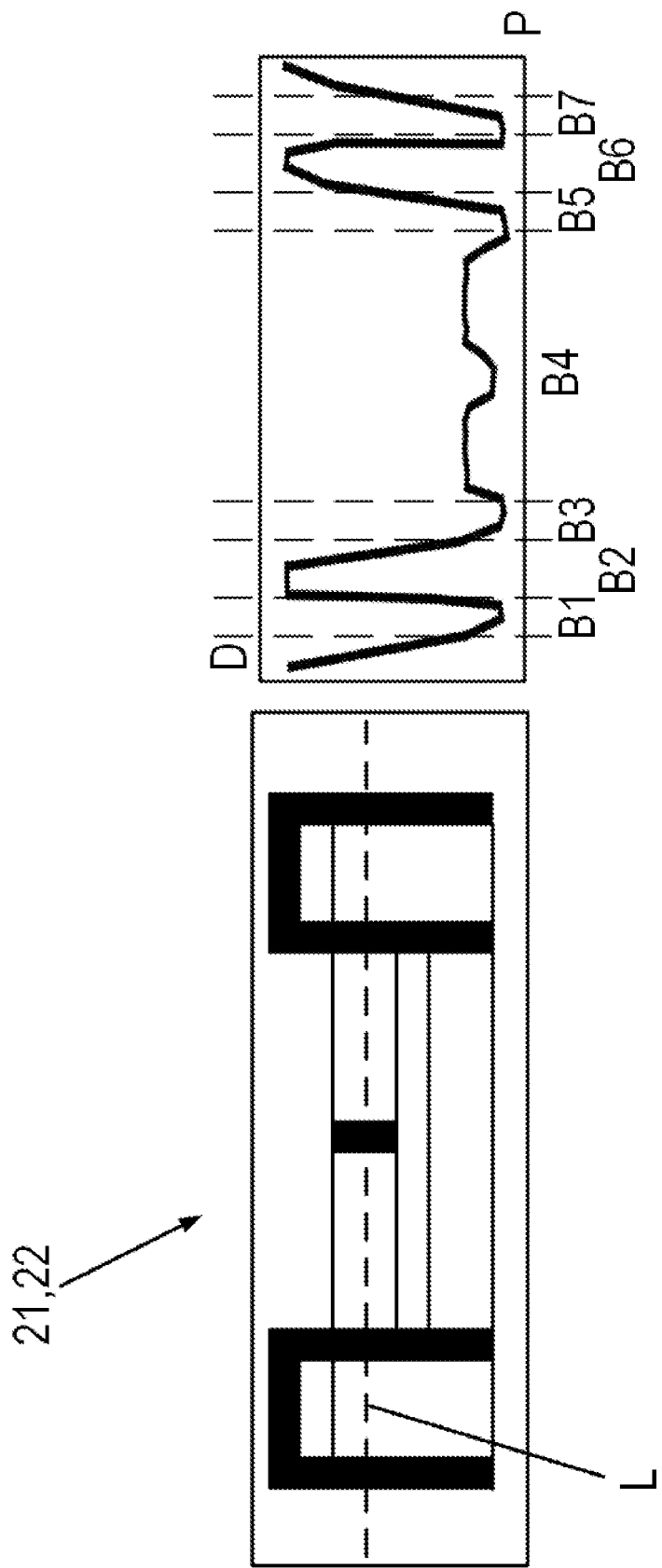
FIG. 7 illustrates measured distances.

FIG. 7 illustrates measured distances D as a function of the position P of the laser beam L in the transverse direction Y. The position P of the laser beam L is divided into seven sections B1, B2, B3, B4, B5, B6, B7.

In the first section B1, the laser beam L impinges on the first outer foot 63 and is reflected by it. In the second section B2, the laser beam L passes between the first outer foot 63 and the first inner foot 61 and impinges on the screen and is reflected by the third reflection surface 33. In the third section B3, the laser beam L impinges on the first inner foot 61 and is reflected by it. In the fourth section B4, the laser beam L impinges on the first plate 7 between the first inner foot 61 and the second inner foot 62 and is reflected by the first reflection surface 31. However, in a central area of the fourth section B4, the laser beam L impinges on the protrusion 40 and is reflected by the fourth reflection surface 34. In the fifth section B5, the laser beam L impinges on the second inner foot 62 and is reflected by it. In the sixth section B6, the laser beam L passes between the second inner foot 63 and the second outer foot 64 and impinges on the screen 5 and is reflected by the third reflection surface 33. In the seventh section B7, the laser beam L impinges on the second outer foot 64 and is reflected by it. The laser beam L thus is tilted upward, and the laser scanner 3 is thus aligned incorrectly, namely too high.

Figure 8:
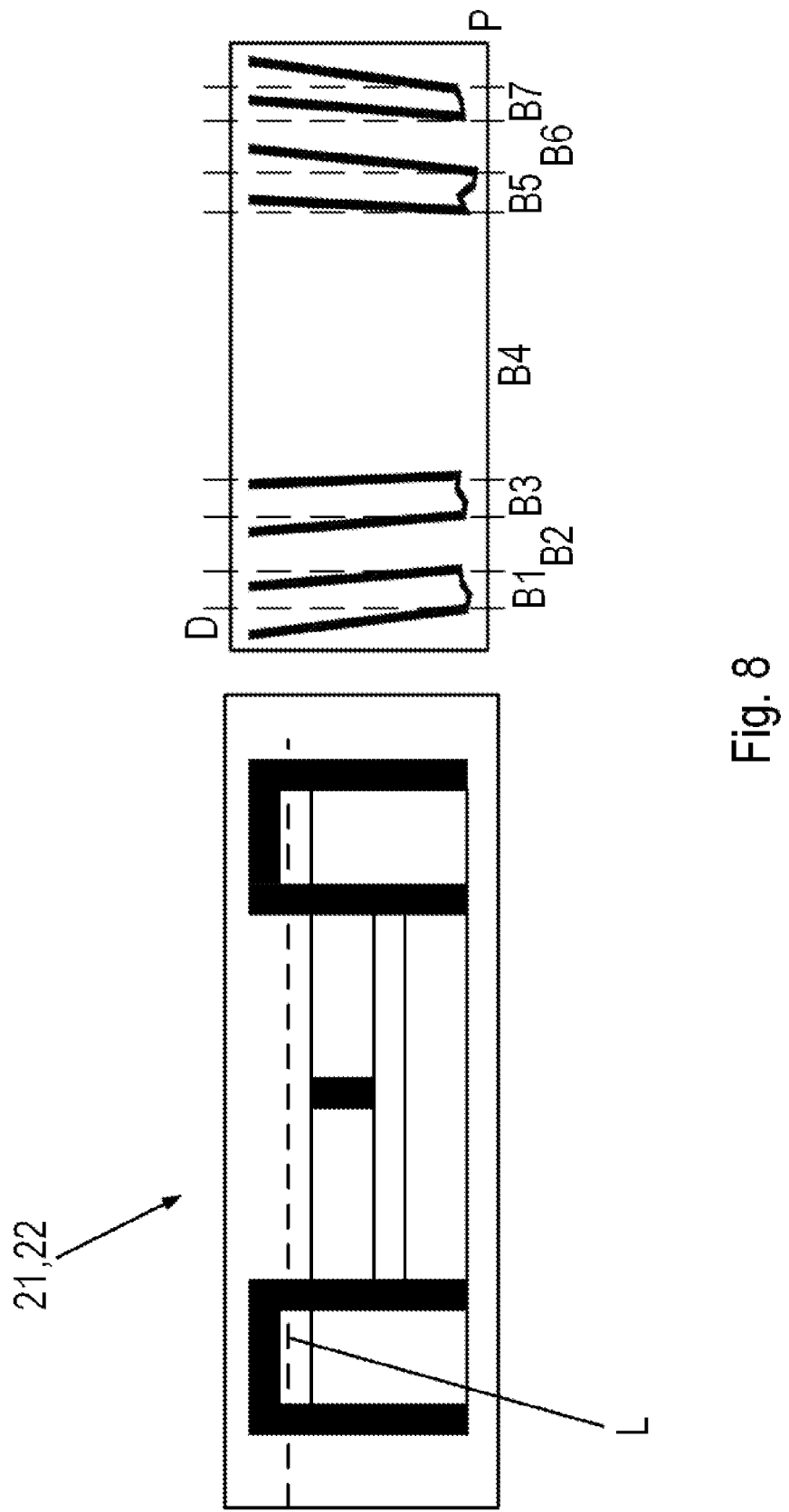
FIG. 8 illustrates measured distances.

FIG. 8 illustrates measured distances D as a function of the position P of the laser beam L in the transverse direction Y. The position P of the laser beam L is divided into seven sections B1, B2, B3, B4, B5, B6, B7.

In the first section B1, the laser beam L impinges on the first outer foot 63 and is reflected by it. In the second section B2, the laser beam L passes between the first outer foot 63 and the first inner foot 61 and is not reflected by the reflection unit 21, 22. In the third section B3, the laser beam L impinges on the first inner foot 61 and is reflected by it. In the fourth section B4, the laser beam L passes between the first inner foot 61 and the second inner foot 62 and is not reflected by the reflection unit 21, 22. In the fifth section B5, the laser beam L impinges on the second inner foot 62 and is reflected by it. In the sixth section B6, the laser beam L passes between the second inner foot 63 and the second outer foot 64 and is not reflected by the reflection unit 21, 22. In the seventh section B7, the laser beam L impinges on the second outer foot 64 and is reflected by it. The laser beam L thus is tilted upward, and the laser scanner 3 is thus aligned incorrectly, namely too high.

LIST OF REFERENCE CHARACTERS

2 Vehicle
3 Laser scanner
4 Digital computer
5 Screen
7 First plate
8 Second plate
9 Gap
10 Spacer
21 First reflection unit
22 Second reflection unit
31 First reflection surface
32 Second reflection surface
33 Third reflection surface
34 Fourth reflection surface
40 Protrusion
50 Ground
61 First inner foot
62 Second inner foot
63 First outer foot
64 Second outer foot
65 Transverse leg
B1 First section
B2 Second section
B3 Third section
B4 Fourth section
B5 Fifth section
B6 Sixth section
B7 Seventh section
D Distance
L Laser beam
P Position
S Beam direction
Y Transverse direction
Z Vertical direction

The invention claimed is:

1. A method for calibrating a laser scanner of a vehicle by at least one reflection unit adapted to reflect a laser beam of the laser scanner, the reflection unit including a first plate, a second plate, and a screen, the first plate arranged between the second plate and the screen in a beam direction, the first plate having a first reflection surface extending at least approximately perpendicular to the beam direction, the second plate having a second reflection surface extending at least approximately perpendicular to the beam direction, the screen having a third reflection surface extending at least approximately perpendicular to the beam direction, the first plate arranged offset from the second plate in a vertical direction to form a gap that extends in the vertical direction and in a transverse direction between the first plate and the second plate, the screen being adapted and arranged so that a projection of the gap in the beam direction is incident on the third reflection surface of the screen, comprising:
    checking an alignment of the laser scanner, the checking including:
        directing a laser beam of the laser scanner at the reflection unit at least approximately in the beam direction;
        moving the laser beam being in the transverse direction along the reflection unit;
        measuring, for a plurality of positions of the laser beam in the transverse direction, a distance of the laser scanner from a respective one of the reflection surfaces from which the laser beam is reflected; and
        determining an alignment of the laser scanner from the measured distances of the laser scanner from the respective one of the reflection surfaces; and
    correcting the alignment of the laser scanner and/or providing an instruction for correction of the laser scanner in response to the determination of an incorrect alignment of the laser scanner;
    wherein an extension of the third reflection surface of the screen in the vertical direction is greater than an extension of the gap in the vertical direction, and an extension of the third reflection surface of the screen in the transverse direction is greater than an extension of the gap in the transverse direction.

2. The method according to claim 1, wherein the checking of the alignment of the laser scanner is repeated at defined and/or periodic time intervals, the correcting and/or providing being performed after each check in response to the determination of the incorrect alignment of the laser scanner.

3. The method according to claim 1, wherein the correcting includes adjusting the laser scanner so that the laser beam impinges on the third reflection surface while moving in the transverse direction through the gap.

4. The method according to claim 1, further comprising determining a slope of a surface on which the vehicle is located before the checking of the alignment of the laser scanner, the reflection unit being aligned so that the gap is at a same height in the vertical direction as the laser scanner.

5. The method according to claim 1, further comprising visually displaying, acoustically signaling, and/or transmitting the determined alignment of the laser scanner to a central computer.

6. A method for calibrating a laser scanner of a vehicle by at least one reflection unit adapted to reflect a laser beam of the laser scanner, the reflection unit including a first plate, a second plate, and a screen, the first plate arranged between the second plate and the screen in a beam direction, the first plate having a first reflection surface extending at least approximately perpendicular to the beam direction, the second plate having a second reflection surface extending at least approximately perpendicular to the beam direction, the screen having a third reflection surface extending at least approximately perpendicular to the beam direction, the first plate arranged offset from the second plate in a vertical direction to form a gap that extends in the vertical direction and in a transverse direction between the first plate and the second plate, the screen being adapted and arranged so that a projection of the gap in the beam direction is incident on the third reflection surface of the screen, comprising:
checking an alignment of the laser scanner, the checking including:
directing a laser beam of the laser scanner at the reflection unit at least approximately in the beam direction;
moving the laser beam being in the transverse direction along the reflection unit;
measuring, for a plurality of positions of the laser beam in the transverse direction, a distance of the laser scanner from a respective one of the reflection surfaces from which the laser beam is reflected; and
determining an alignment of the laser scanner from the measured distances of the laser scanner from the respective one of the reflection surfaces; and
correcting the alignment of the laser scanner and/or providing an instruction for correction of the laser scanner in response to the determination of an incorrect alignment of the laser scanner:
wherein the at least one reflection unit includes a first reflection unit and a second reflection unit, the first reflection unit and the second reflection unit being arranged so that a vertical direction of the first reflection unit is parallel to a vertical direction of the second reflection unit, the method further comprising:
directing the laser beam of the laser scanner at the first reflection unit at least approximately in a beam direction of the first reflection unit;
moving the laser beam in a transverse direction of the first reflection unit along the first reflection unit;
for a plurality of positions of the laser beam in the transverse direction, measuring a respective distance of the laser scanner from the respective one of the reflection surfaces of the first reflection unit from which the laser beam is reflected;
directing the laser beam of the laser scanner at the second reflection unit at least approximately in a beam direction of the second reflection unit;
moving the laser beam in a transverse direction of the second reflection unit along the second reflection unit; and
for a plurality of positions of the laser beam in the transverse direction, measuring a respective distance of the laser scanner from a respective one of the reflection surfaces of the second reflection unit from which the laser beam is reflected.

7. The method according to claim 6, wherein the first reflection unit and the second reflection unit are arranged so that the beam direction of the first reflection unit is at least approximately perpendicular to the beam direction of the second reflection unit.

8. The method according to claim 6, wherein the first reflection unit and the second reflection unit are arranged so that the beam direction of the first reflection unit is at least approximately parallel to the transverse direction of the second reflection unit.

9. The method according to claim 6, wherein the first reflection unit and the second reflection unit are arranged so that the gap of the first reflection unit and the gap of the second reflection unit are aligned with each other in the vertical direction.

10. A method for calibrating a laser scanner of a vehicle by at least one reflection unit adapted to reflect a laser beam of the laser scanner, the reflection unit including a first plate, a second plate, and a screen, the first plate arranged between the second plate and the screen in a beam direction, the first plate having a first reflection surface extending at least approximately perpendicular to the beam direction, the second plate having a second reflection surface extending at least approximately perpendicular to the beam direction, the screen having a third reflection surface extending at least approximately perpendicular to the beam direction, the first plate arranged offset from the second plate in a vertical direction to form a gap that extends in the vertical direction and in a transverse direction between the first plate and the second plate, the screen being adapted and arranged so that a projection of the gap in the beam direction is incident on the third reflection surface of the screen, comprising:
checking an alignment of the laser scanner, the checking including:
directing a laser beam of the laser scanner at the reflection unit at least approximately in the beam direction;
moving the laser beam being in the transverse direction along the reflection unit;
measuring, for a plurality of positions of the laser beam in the transverse direction, a distance of the laser scanner from a respective one of the reflection surfaces from which the laser beam is reflected; and
determining an alignment of the laser scanner from the measured distances of the laser scanner from the respective one of the reflection surfaces; and
correcting the alignment of the laser scanner and/or providing an instruction for correction of the laser scanner in response to the determination of an incorrect alignment of the laser scanner;
wherein the reflection unit includes a first inner foot, a second inner foot, a first outer foot, and a second outer foot arranged offset from each other in the transverse direction, and extending predominantly in the vertical direction, the first plate and the second plate extending in the transverse direction between the inner feet, and the screen extending in the transverse direction between the outer feet.

11. A method for calibrating a laser scanner of a vehicle by at least one reflection unit adapted to reflect a laser beam of the laser scanner, the reflection unit including a first plate, a second plate, and a screen, the first plate arranged between the second plate and the screen in a beam direction, the first plate having a first reflection surface extending at least approximately perpendicular to the beam direction, the second plate having a second reflection surface extending at least approximately perpendicular to the beam direction, the screen having a third reflection surface extending at least approximately perpendicular to the beam direction, the first plate arranged offset from the second plate in a vertical direction to form a gap that extends in the vertical direction and in a transverse direction between the first plate and the second plate, the screen being adapted and arranged so that a projection of the gap in the beam direction is incident on the third reflection surface of the screen, comprising:

checking an alignment of the laser scanner, the checking including:
  directing a laser beam of the laser scanner at the reflection unit at least approximately in the beam direction;
  moving the laser beam being in the transverse direction along the reflection unit;
  measuring, for a plurality of positions of the laser beam in the transverse direction, a distance of the laser scanner from a respective one of the reflection surfaces from which the laser beam is reflected; and
  determining an alignment of the laser scanner from the measured distances of the laser scanner from the respective one of the reflection surfaces; and
 correcting the alignment of the laser scanner and/or providing an instruction for correction of the laser scanner in response to the determination of an incorrect alignment of the laser scanner;
 wherein the first plate includes a projection having a fourth reflection surface extending at least approximately perpendicular to the beam direction, the fourth reflection surface being arranged offset from the first reflection surface in the beam direction.

12. The method according to claim 1, wherein the vehicle is arranged as an autonomous vehicle.

13. A method for calibrating a laser scanner of a vehicle by at least one reflection unit adapted to reflect a laser beam of the laser scanner, the reflection unit including a first plate, a second plate, and a screen, the first plate arranged between the second plate and the screen in a beam direction, the first plate having a first reflection surface extending perpendicular to the beam direction, the second plate having a second reflection surface extending perpendicular to the beam direction, the screen having a third reflection surface extending perpendicular to the beam direction, the first plate arranged offset from the second plate in a vertical direction to form a gap that extends in the vertical direction and in a transverse direction between the first plate and the second plate, the screen being adapted and arranged so that a projection of the gap in the beam direction is incident on the third reflection surface of the screen, comprising:

checking an alignment of the laser scanner, the checking including:
  directing a laser beam of the laser scanner at the reflection unit in the beam direction;
  moving the laser beam being in the transverse direction along the reflection unit;
  measuring, for a plurality of positions of the laser beam in the transverse direction, a distance of the laser scanner from a respective one of the reflection surfaces from which the laser beam is reflected; and
  determining an alignment of the laser scanner from the measured distances of the laser scanner from the respective one of the reflection surfaces; and
 correcting the alignment of the laser scanner and/or providing an instruction for correction of the laser scanner in response to the determination of an incorrect alignment of the laser scanner;
 wherein an extension of the third reflection surface of the screen in the vertical direction is greater than an extension of the gap in the vertical direction, and an extension of the third reflection surface of the screen in the transverse direction is greater than an extension of the gap in the transverse direction.

14. A method for calibrating a laser scanner of a vehicle by at least one reflection unit adapted to reflect a laser beam of the laser scanner, the reflection unit including a first plate, a second plate, and a screen, the first plate arranged between the second plate and the screen in a beam direction, the first plate having a first reflection surface extending perpendicular to the beam direction, the second plate having a second reflection surface extending perpendicular to the beam direction, the screen having a third reflection surface extending perpendicular to the beam direction, the first plate arranged offset from the second plate in a vertical direction to form a gap that extends in the vertical direction and in a transverse direction between the first plate and the second plate, the screen being adapted and arranged so that a projection of the gap in the beam direction is incident on the third reflection surface of the screen, comprising:

checking an alignment of the laser scanner, the checking including:
  directing a laser beam of the laser scanner at the reflection unit in the beam direction;
  moving the laser beam being in the transverse direction along the reflection unit;
  measuring, for a plurality of positions of the laser beam in the transverse direction, a distance of the laser scanner from a respective one of the reflection surfaces from which the laser beam is reflected; and
  determining an alignment of the laser scanner from the measured distances of the laser scanner from the respective one of the reflection surfaces; and
 correcting the alignment of the laser scanner and/or providing an instruction for correction of the laser scanner in response to the determination of an incorrect alignment of the laser scanner;
 wherein the at least one reflection unit includes a first reflection unit and a second reflection unit, the first reflection unit and the second reflection unit being arranged so that a vertical direction of the first reflection unit is parallel to a vertical direction of the second reflection unit, the method further comprising:
 directing the laser beam of the laser scanner at the first reflection unit in a beam direction of the first reflection unit;
 moving the laser beam in a transverse direction of the first reflection unit along the first reflection unit;
 for a plurality of positions of the laser beam in the transverse direction, measuring a respective distance of the laser scanner from the respective one of the reflection surfaces of the first reflection unit from which the laser beam is reflected;
 directing the laser beam of the laser scanner at the second reflection unit in a beam direction of the second reflection unit;
 moving the laser beam in a transverse direction of the second reflection unit along the second reflection unit; and
 for a plurality of positions of the laser beam in the transverse direction, measuring a respective distance of the laser scanner from a respective one of the reflection surfaces of the second reflection unit from which the laser beam is reflected.

15. The method according to claim 14, wherein the first reflection unit and the second reflection unit are arranged so that the beam direction of the first reflection unit is perpendicular to the beam direction of the second reflection unit.

16. The method according to claim 14, wherein the first reflection unit and the second reflection unit are arranged so that the beam direction of the first reflection unit is parallel to the transverse direction of the second reflection unit.

17. A method for calibrating a laser scanner of a vehicle by at least one reflection unit adapted to reflect a laser beam of the laser scanner, the reflection unit including a first plate, a second plate, and a screen, the first plate arranged between the second plate and the screen in a beam direction, the first plate having a first reflection surface extending perpendicular to the beam direction, the second plate having a second reflection surface extending perpendicular to the beam direction, the screen having a third reflection surface extending perpendicular to the beam direction, the first plate arranged offset from the second plate in a vertical direction to form a gap that extends in the vertical direction and in a transverse direction between the first plate and the second plate, the screen being adapted and arranged so that a projection of the gap in the beam direction is incident on the third reflection surface of the screen, comprising:
  checking an alignment of the laser scanner, the checking including:
    directing a laser beam of the laser scanner at the reflection unit in the beam direction;
    moving the laser beam being in the transverse direction along the reflection unit;
    measuring, for a plurality of positions of the laser beam in the transverse direction, a distance of the laser scanner from a respective one of the reflection surfaces from which the laser beam is reflected; and
    determining an alignment of the laser scanner from the measured distances of the laser scanner from the respective one of the reflection surfaces; and
  correcting the alignment of the laser scanner and/or providing an instruction for correction of the laser scanner in response to the determination of an incorrect alignment of the laser scanner;
  wherein the first plate includes a projection having a fourth reflection surface extending perpendicular to the beam direction, the fourth reflection surface being arranged offset from the first reflection surface in the beam direction.

18. The method according to claim 13, wherein the vehicle is arranged as an autonomous vehicle.

19. An apparatus, comprising:
  at least one vehicle that includes a laser scanner; and
  at least one reflection unit adapted to reflect a laser beam of the laser scanner;
  wherein the apparatus is adapted to perform the method recited in claim 1.

20. The apparatus according to claim 19, wherein the apparatus is arranged as a production plant, and the vehicle is arranged as an autonomous vehicle.

21. An apparatus, comprising:
  at least one vehicle that includes a laser scanner; and
  at least one reflection unit adapted to reflect a laser beam of the laser scanner;
  wherein the apparatus is adapted to perform the method recited in claim 13.

22. The apparatus according to claim 21, wherein the apparatus is arranged as a production plant, and the vehicle is arranged as an autonomous vehicle.

* * * * *